July 28, 1964
J. MERCIER
3,142,318
PISTON ACCUMULATOR
Original Filed Feb. 10, 1953
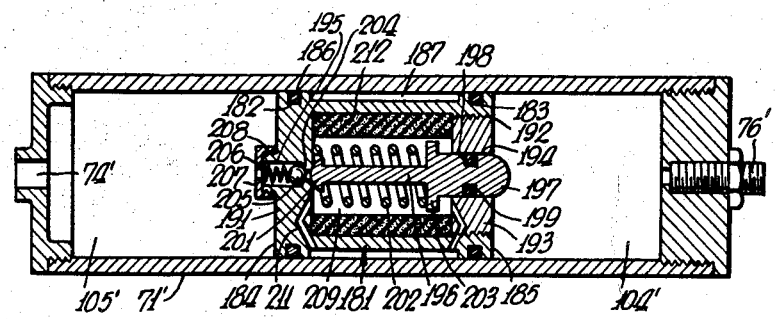
INVENTOR
Jean Mercier
BY
ATTORNEYS

United States Patent Office

3,142,318
Patented July 28, 1964

---

3,142,318
PISTON ACCUMULATOR
Jean Mercier, 1185 Park Ave., New York, N.Y.
Application Oct. 9, 1957, Ser. No. 689,223, now Patent
No. 3,074,437, dated Jan. 22, 1963, which is a division
of application Ser. No. 336,054, Feb. 10, 1953, now
Patent No. 2,817,361. Divided and this application
Dec. 18, 1962, Ser. No. 245,536
4 Claims. (Cl. 138—31)

This invention relates to piston type pressure vessels such as pressure accumulators or the like and more particularly to the piston seal between the gas and liquid chambers of the pressure vessel.

As conducive to an understanding of the invention, it is noted that unless a dependable seal is provided for the piston between the gas and liquid chambers of a piston type pressure vessel, the resultant leakage of liquid into the gas chamber necessitates frequent servicing of the device for draining of such liquid and the leakage of gas into the liquid chamber and its subsequent entry into the hydraulic system might be detrimental to the proper functioning of the unit to be operated by the device such as, for example, the hydraulic brakes of a truck which would not operate dependably if a gas bubble entered the unit.

Where a single O ring type seal is used for the piston, the effectiveness of such seal is poor when the pressure on both sides of the piston is identical, as is usually the case in piston type pressure vessels, for such seal only operates effectively when there is a greater pressure on one side than the other which will force the O ring toward the low pressure side into the space between the piston and the adjacent wall of the device to create an effective seal.

Where two O rings are used on a piston on each side of annular groove therein, and the annular groove is vented to atmosphere in an attempt to secure a differential between the pressure on opposite sides of each of the rings, as pressure vessels are generally used under relatively high pressures, the differential is often so great as to cause excessive distortion of the O rings with resultant extrusion between the piston and the wall of the device, so that upon sliding movement of the piston in use of the device, the O rings will rapidly break down with resultant failure of the seal and leakage between the liquid and gas chambers.

Accordingly, it is among the objects of the invention to provide a piston type pressure vessel which will function without leakage between the gas and liquid chambers and without likelihood of injury to the resilient sealing means between the piston and the wall of the device even after long periods of use, which device is relatively simple in construction having but few parts, none of which are delicate or likely to become deranged and which may readily be assembled and disassembled for cleaning and maintenance.

Another object is to provide a pressure device of the above type which will permit a predetermined differential between the pressure on opposed sides of the resilient sealing means, which pressure during normal operation of the device is considerably less than the difference between atmospheric pressure and the pressure in the liquid and gas chambers.

Another object is to provide a pressure device of the above type which upon attainment of a predetermined pressure on the inner sides of the resilient sealing means will permit discharge of fluid into the liquid chamber of the device to retain such pressure at no greater than the predetermined amount.

According to the broad aspect of the invention, a pair of resilient seals encompasses the periphery of a piston type pressure vessel and are positioned on each side respectively of an annular groove associated with the periphery of said piston. Valve means are provided, operatively connected to such annular groove and adapted to discharge fluid therefrom when a predetermined pressure has been attained therein.

This application is a division of copending application Serial No. 689,223, filed October 9, 1957, now Patent No. 3,074,437, which was a division of copending application Serial No. 336,054, filed February 10, 1953, now Patent No. 2,817,361, dated December 24, 1957.

In the accompanying drawings the single figure is one of various possible embodiments of the several features of the invention.

Referring now to the drawings in the embodiment shown, a substantially cylindrical piston 181 is slidably mounted in shell 71'. This piston desirably has a pair of spaced annular grooves 182 and 183 near its ends 184 and 185 respectively, and an elongated annular groove 187 extending between the annular groves 182 and 183, a resilient sealing member such as an O ring 186 desirably being positioned in each of such annular grooves 182, 183. The piston 181 is desirably cup-shaped, having a wall 191 at its end 184 and having an open mouth 192 at its end 185, the mouth 192 being desirably sealed by a threaded plug 193 having an axial bore 194 therethrough desirably longitudinally aligned with axial bore 195 through end wall 191.

Positioned in the bore 209 of piston 181 is a rod 196 desirably of enlarged diameter at one end as at 197, said enlarged diameter end 197 being slidable in bore 194 with substantially no transverse play and desirably having an annular groove 198 in which an O ring 199 is positioned to provide a seal between the wall of bore 194 and the outer surface of enlarged portion 197. The other end of rod 196 is also desirably of enlarged diameter as at 201. The enlarged portion 201 of rod 196 is normally urged away from bore 195 by means of a coil spring 202 encompassing said rod and compressed between wall 191 and annular shoulder 203 rigid with said rod. The bore 195 desirably is of reduced diameter at its inner end defining a seat 204 against which is positioned a ball 205, the latter being retained on its seat by means of a coil spring 206 in said bore compressed between the ball and a ported cap 207 threaded on an annular boss 208 about said bore 195.

Desirably the bore 209 of the piston is in communication with annular groove 187 by means of a passageway 211, and a sleeve 212 of resilient material such as foam rubber may be positioned in bore 209 encompassing the coil spring 202 and being normally spaced therefrom as shown.

In the operation of the embodiment shown, gas under pressure is forced through gas valve 76' into chamber 104'. As a result, the piston 181 will be moved to the left. Assuming that the pressure device is to be used under a maximum pressure of 3,000 p.s.i., fluid is forced through inlet port 74' into chamber 105' under greater pressure than that of the gas in chamber 104' which is initially at say 1,000 p.s.i. By reason of the ball valve 205, no fluid will be forced into the piston bore 209 when chamber 105' is initially charged. As a result, the piston will be moved to the right further compressing the gas in chamber 104'. As at this time the gas in the piston bore 209 and groove 187 is substantially at atmospheric pressure, much less than the pressure in chamber 104', and exerted by the gas against the enlarged end 197 of rod 196 will overcome the atmospheric pressure plus the force exerted by spring 202 to move enlarged portion 201 to seal bore 195.

After a few operations of the pressure device which will discharge fluid from port 74', the successive movements of the piston to the left will provide a pumping action which will force fluid into annular groove 187 and through passageway 211 into bore 209 quickly to increase the pressure therein and also increase the differential between the pressure on opposed sides of the O-rings 186. Such movements of the piston will also cause the gas pressure and consequently the fluid pressure in chambers 104' and 105' respectively to be reduced below the maximum original pressure of 3,000 p.s.i.

As long as the pressure in the piston bore 209 and annular groove 187 plus the force exerted by spring 202 is less than the force provided by the pressure in gas chamber 104', against the enlarged end 197 of rod 196, bore 195 will remain sealed. As the pumping action continues with use of the device, the pressure in the piston bore will rise sufficiently so that combined with spring 202 it will overcome the pressure of the gas in chamber 104' and the rod 196 will be moved to the right to move enlarged portion 201 away from bore 195. However, as long as the pressure of the fluid in the chamber 105' is greater than that in the piston bore 209 and groove 185, ball 205 will remain seated so that no fluid can flow out of the piston.

As the pumping action continues, the pressure in the piston bore and groove 187 will quickly rise to a value above that of the fluid pressure in chamber 105'. Thus, a differential between the pressure on opposed sides of the O-ring will still be maintained with the pressure being greater on the inner side of said O-rings. When the pressure in the piston rises to an amount such as to exceed the pressure in the fluid chamber by greater than the force exerted by spring 206, the ball 205 will be moved off its seat for relief of pressure from the piston bore 209 and groove 187 and such ball will again seat. The spring 206 may exert such force, for example, that it requires a pressure of 1,000 p.s.i. to move ball 205 off its seat. Thus, the differential between the pressure on opposed sides of the O-rings will never fall below this amount once it is attained during normal operation.

With the construction above described, a maximum differential is provided between the pressure on opposed sides of the O-rings to insure dependable sealing action yet without such distortion of the O-ring seals which might cause extrusion thereof with resultant breakdown and failure of the seal.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a cylinder having a gas inlet port and a fluid port, a piston slidably mounted in said cylinder intervening between said ports and defining a gas chamber and a fluid chamber, said piston having a pair of spaced annular grooves in its periphery and a third elongated annular groove interposed between said pair of annular grooves, a resilient deformable annular seal in each of said pair of spaced annular grooves, said seals engaging the inner wall of said cylinder, said piston having a chamber therein with a wall at each end exposed in said gas chamber and said fluid chamber respectively, said piston chamber being in communication with said elongated annular groove, the wall exposed in said fluid chamber having a passageway therethrough providing communication between said fluid chamber and the piston chamber, an axial rod slidably mounted in said piston, said rod having one end exposed in said gas chamber and its other end controlling the flow of fluid from said piston chamber through said passageway into said fluid chamber, the wall of said piston in said gas chamber having an axial bore, said passageway in the wall of said piston in said fluid chamber being axially aligned with said axial bore, said rod being slidably mounted at one end in the bore in said gas chamber wall and exposed to the contents of said gas chamber, resilient means normally urging the other end of said rod away from the passageway in said fluid chamber wall, said passageway being of reduced diameter at its inner end defining a valve seat, a valve member in said passageway and resilient means normally urging said valve member against its seat to seal said passageway.

2. The combination recited in claim 1 in which the resilient means comprises a coil spring encompassing said rod and compressed between said fluid chamber wall and a flange rigid with said rod, the other end of said rod being conformed as a valve head adapted to seal said passageway when moved thereagainst.

3. The combination recited in claim 1 in which a compressible member is positioned in said piston bore encompassing said rod and said resilient means.

4. The combination recited in claim 1 in which a compressible member is positioned in said piston bore encompassing said rod and said resilient means, said compressible member being a sleeve of foam rubber.

References Cited in the file of this patent

UNITED STATES PATENTS

| | | |
|---|---|---|
| Re. 24,382 | Greer | Oct. 29, 1957 |
| 2,688,984 | Snyder | Sept. 14, 1954 |
| 2,748,801 | McCuistion | June 5, 1956 |
| 2,764,998 | McCuistion | Oct. 2, 1956 |
| 2,790,462 | Ashton | Apr. 30, 1957 |